United States Patent
Lei et al.

(10) Patent No.: US 6,965,715 B2
(45) Date of Patent: Nov. 15, 2005

(54) LENS AND METHOD FOR PRODUCING A LENS

(75) Inventors: Fang Lei, Durchhausen (DE); Klaus Renner, Liptingen (DE); Jurgen Rudischhauser, Tuttlingen (DE); Markus Kupferschmid, Liptingen (DE)

(73) Assignee: Karl Storz GmbH & Co. KG, (DE)

( * ) Notice: Subject to any disclaimer, the term of this patent is extended or adjusted under 35 U.S.C. 154(b) by 0 days.

(21) Appl. No.: 10/816,415

(22) Filed: Apr. 1, 2004

(65) Prior Publication Data

US 2004/0257665 A1    Dec. 23, 2004

Related U.S. Application Data

(63) Continuation of application No. PCT/EP02/10949, filed on Sep. 30, 2002.

(30) Foreign Application Priority Data

Oct. 1, 2001  (DE) ................. 101 48 532

(51) Int. Cl.⁷ ............................. G02B 6/32; G02B 3/00
(52) U.S. Cl. ................. 385/34; 385/33; 385/119; 385/146; 359/642; 359/662; 359/707; 359/708
(58) Field of Search ................. 385/33, 34, 85, 385/146, 119; 359/642, 662, 707, 708

(56) References Cited

U.S. PATENT DOCUMENTS

| | | | |
|---|---|---|---|
| 2,073,300 A * | 3/1937 | Frederick et al. | 359/543 |
| 3,194,266 A | 7/1965 | Abbott et al. | 137/627.5 |
| 3,814,134 A | 6/1974 | Vanti | 137/627.5 |
| 4,815,807 A * | 3/1989 | Kaneko et al. | 385/33 |
| 4,901,207 A * | 2/1990 | Sato et al. | 362/555 |
| 4,941,072 A * | 7/1990 | Yasumoto et al. | 362/249 |
| 5,423,312 A * | 6/1995 | Siegmund et al. | 600/109 |
| 5,638,479 A * | 6/1997 | Takami et al. | 385/124 |
| 6,220,295 B1 | 4/2001 | Bouchard et al. | 137/625.44 |

FOREIGN PATENT DOCUMENTS

| | | |
|---|---|---|
| DE | 762 584 | 1/1953 |
| DE | 36 08 550 A1 | 9/1987 |
| FR | 2 444 212 | 7/1980 |

\* cited by examiner

Primary Examiner—Brian M. Healy
(74) Attorney, Agent, or Firm—St. Onge Steward Johnston & Reens LLC (57) ABSTRACT

A rod lens with one or more optically active surfaces and one or more inactive surfaces, in which one part of the optically inactive surface or surfaces, especially a lens facet and/or radial peripheral surface of a lens, is smooth, and a method for smoothing one part of one or more optically inactive surfaces of a lens, especially of a lens facet and/or radial peripheral surface of a lens. As a result, the occurrence of fissures in the lens is prevented or reduced.

21 Claims, 8 Drawing Sheets

LENS AND METHOD FOR PRODUCING A LENS

This application is a continuation of pending International Patent Application No. PCT/EP02/10949 filed Sep. 30, 2002 which designates the United States and claims priority of pending German Application No. 101 48 532.8 filed Oct. 1, 2001.

FIELD OF THE INVENTION

The invention relates to a lens for use in optical systems.

Optical lenses are employed in a number of optical instruments, for instance in telescopes and binoculars, microscopes, endoscopes, and such other viewing devices as technoscopes, periscopes, and the like.

Optical lenses in the aforementioned application fields are, as a rule, arranged as a lens system, one after the other, contiguous to one another, or set off at a distance from one another.

The lenses in such a system are fixed with respect to the shaft, in that they are pressed onto ring-shaped external segments of their lateral surfaces by a fixing device. Several lenses can be secured in place together if the lenses are placed contiguous to one another peak-to-peak or if distancing sleeves, which hold the lenses to ring-shaped external segments of their lateral surfaces, are each firmly pressed between two neighboring lenses.

With endoscopes in particular, along with other optical devices, lenses are often employed in the form of rod lenses.

With rod lenses, in a first processing step the entire outer surface is ground. In a subsequent processing step, all optically active surfaces are polished to produce the smoothest possible surfaces, a surface processing which results in reflecting surfaces.

In the document JP 2000117603A it is proposed that the entire surface of a lens should be polished, that is, the radial peripheral surface is also to be polished, in order to prevent breakage of the lens from the impact of heat.

In rod lenses the peripheral surface makes up the greatest portion of the surface. If this surface is completely polished, or becomes reflecting, then any kind of diffusive light is reflected without being weakened, causing a deterioration in image contrast. Therefore, the process according to document JP 2000117603A is not appropriate for rod lenses. To prevent these reflections from appearing on the peripheral surface, it is customary to omit polishing of all optically inactive surfaces, that is, on all radial peripheral surfaces.

Grinding lenses on the optically inactive surfaces, however, is a process in which microscopically detected particles are torn out of the composite lens material, setting off mechanical interface forces which often cause deeper-lying particles to be torn out and therefore lead to the formation of fissures.

In systems made up of rod lenses, especially those with longer shafts as are found especially in endoscopy, there is a problem concerning bending pressures which are exerted on the shaft. The shaft, which is relatively easy to bend because of its small diameter compared to its length, transmits bending forces that can put severe mechanical pressure on rod lenses.

In the installation of lenses in the shaft, additional mechanical pressures occur, for instance through the rotating of screwable fixing devices against the ring-shaped external segments of the lateral surfaces of lenses that are to be fixed in place.

Because lenses and spacing devices in most known systems are installed in the shaft with some free play, abrasive motions can also occur between these neighboring components and/or the shaft.

In addition to the aforementioned bending pressure, when lenses are used in one of the mentioned systems, additional disturbances can also occur, such as collision or bending forces, if the corresponding lens system, for instance on falling, suffers an impact.

Aside from mechanical impacts, thermal impacts can occur in the lens system, especially in endoscopy. They can occur, first, when a cold endoscope shaft is introduced into the human body, causing a change in temperature, both in terms of time, upon inserting and removing the endoscope shaft, as well as in terms of place, where a temperature gradient exists between the endoscope shaft segment lying outside the body and the segment that is inside the body. Second, thermal impacts occur especially in autoclaving (at 134 degrees C.), a treatment to make the endoscope germ-free.

Because the lens material is glass and the materials of the shaft and the distance holders, usually steel alloys, have differing thermal expansion coefficients, the result can be relative movements between neighboring lenses and distance holders or lenses and the shaft. These movements can also cause abrasive forces in the lens.

When the shaft bends, essential forces are received exactly on the edge between the optically active surface of the lens and its radial peripheral surface. In addition, at or near this edge of the aforementioned abrasion and impact forces, at least those are received that are applied to the lens from distancing sleeves or generally axial holders of the lens in the system. When forces are contiguous to an edge or lie near it, edge areas of the stressed material can break off especially easily, and can do so all the more if the edge is sharply pointed.

To reduce the risk of this type of fragmentation, it is proposed in publication DE197 50 685 A1 that the rod lenses should be centered by means of anti-abrasion distance holders at a defined distance to the inside of the sleeve. Thus there is a gap between the lens and sleeve, so that if the sleeve bends to a certain degree, the lens does not come in contact with the sleeve.

An additional possibility of preventing fissures and fragmentation on the lens is to equip the lens with a bevel, the facet, positioned between the optically active surface and the radial peripheral surface of the lens.

Despite this preventive measure, the fragmentation of lens particles at and close to these edges cannot always be prevented. This problem occurs especially with rod lenses, for the aforementioned reasons.

The object of the invention therefore is to provide a rod lens and a method for producing rod lenses, in which the fragmentation of lens particles is more effectively reduced or prevented.

The invention fulfills this object by means of a rod lens as in patent claim 1, or through a method for producing rod lenses as in patent claim 7.

Advantageous refinements of the invention are presented in the subsidiary patent claims 3 to 6 or 9 to 15 plus 16 and 17.

Through a fundamental effect of the invention, microfissures, which are caused by the production of facets or grinding of the entire lens including surface areas that are later not processed to make optically active surfaces, are reduced in number and depth or eliminated.

Surface areas that are not processed to make optically active surfaces can be facets, as well as radial peripheral areas of the lens, and in the latter case particularly axial end segments of the radial peripheral surfaces, at which very high forces are brought to bear on the lens through bending.

Rod lenses often contain, especially in the end areas, several elements that are cemented together. To reduce mechanical impacts to cemented surfaces, document DE 31 13 110 A1 proposes bone-shaped rod lenses, in which the diameter at an axially central segment is smaller than at segments situated outside these segments of the radial peripheral surface. With the bending of the shaft, it touches the rod lenses only on the front and rear end segments of the sections with larger diameter, and consequently only small forces are transmitted to the cemented surfaces.

Another object of the invention is to provide a bone-shaped rod lens and a method for producing bone-shaped rod lenses, in which the breaking off of lens fragments is even more effectively reduced or prevented.

The invention fulfills this object through a rod lens as in patent claim 2, or through a method for producing rod lenses as in patent claim 8.

Advantageous refinements of the invention are presented in the subsidiary patent claims 3 to 6 or 9 to 15, along with 16 and 17.

In shaft bending with bone-shaped lenses, the only surfaces touching the shaft are, on the lens peripheral surface, the axially outer and inner end segments of the radial outer peripheral surfaces, which are thickened in comparison to the axially inner radial peripheral surfaces of the bone-shape lens. According to the invention, these axial end segments of the thickened radial peripheral areas of the rod lens, in particular, have at least one smooth surface section, so that an axially central segment is not smooth.

The lenses produced according to the invention are preferably those that are used in a lens system in which at least one of the lenses is secured with a sleeve-type device and/or at least one likewise sleeve-like distance holder is used between lenses.

Through the method according to the invention, the surface of the at least one optically inactive surface of the lens is treated both in terms of the depth of the roughness and in terms of the fine structure of the roughness, that is, the sharp-edged quality of the microscopic elevations. The surface treatment according to the invention allows the surface to be finer than in conventional grinding processing.

According to one aspect of the invention, the at least one optically inactive surface of the lens in a rod lens system is so smooth that its surface is reflective according to ISO 10110. The surface treated in this manner is referred to, consequently, as a polished surface.

The surface treatment according to the invention can accordingly be a polishing, which results in a roughness of class P1 or P2 according to ISO 1302: 1992—or in extreme cases, still finer. Accordingly the surface becomes smoother, and micro-craters, which provide germs for the formation of fissures, are burred and reduced.

The lens can be polished, according to the invention, either as conventional polishing with polishing agents, as described more closely below, having appropriate graininess and hardness in the form of a paste or the like, or as a polishing grinding process, in which the particular polishing agent is mounted on a polishing agent carrier or embedded into it, so that an appropriate roughness of the polishing agent is obtained on the surface.

Polishing agent carriers can be pitch, laminated fabric, Kraft paper, polyurethane sheets, felt, synthetics such as cast resin, as well as many other materials or compounds.

Polishing agents, that is polishing components, can include cerium oxide, iron oxide, circonium oxide, aluminum oxide, and other metallic oxides. Granular diamond, of grade D7, is preferably used. Smaller grade diamond grain such as D5 or smaller can also be considered, although it will require longer processing time.

In all aforementioned polishing treatments, the polishing time must be increased in cases of reduced pressure and/or reduced speed of the polishing agent over the surface to be treated. Polishing time, pressure, and polishing agent speed should be adjusted as appropriate, depending on the parameters of the surface to be treated such as type of glass and treatment parameters, for instance temperature.

As an alternative to polishing treatment of the at least one optically inactive surface of a lens, the invention also proposes a non-chipping processing of the optically inactive surface of the lens by moving the processing agent rapidly and with firm pressure, causing frictional heat on the processed surface so that the external surface layers of the optically inactive surface of the lens are converted into a melted or transitional condition, which is a borderline condition between a solid and a liquid phase. Because of this melting, or transitional condition, exerting pressure can cause melting of fissures as well as uneven areas that have existed as surface roughness on the optically inactive surface or surfaces of the lens. The surface roughness becomes smooth, both quantitatively, that is in terms of depth of roughness, and qualitatively, that is in terms of the shape of microscopic peaks and valleys of the rough surface.

In this process the speed of motion as well as any additionally applied pressure can be constant or variable, and in either case can be adjusted or controlled in terms of lens size, type of glass, existing fissures, and desired surface roughness.

This surface treatment can also occur with speeds corresponding to those of high-speed grinding, although here too it is necessary to adjust the processing time and possibly the pressure, usually by decreasing them. By appropriately increasing the processing speed, while reducing pressure, it is possible to reduce or prevent the tearing out of lens particles during the processing.

In an additional aspect of the invention the at least one optically inactive surface of the lens is radiated with a laser beam so that the external surface layers are melted or placed in the previously described transition condition, so that the surfaces are smoothed and micro fissures, which have been caused by the production of the facet or the entire lens with facet, are reduced or eliminated. To bring lenses into the transitional or the melted condition, temperatures of nearly 500 degrees C., preferably even 700 degrees C. or more, are applied. This temperature treatment of the lens surface by means of laser radiation entails no mechanical processing and therefore no danger of mechanical releasing of lens particles.

In addition, pressure, preferably with a sufficiently smooth processing agent, can also be applied on the processed optically inactive surface of the lens. This can be done either statically or by means of a rotating motion of the processing agent over the surface to be treated.

The invention also relates to a rod lens system, in which at least one of the rod lenses has at least one optically inactive surface, and which is treated as described above.

In addition the invention relates to endoscopes that include a rod lens system with one or more rod lenses with at least one inventively treated optically inactive surface.

In the following the invention is described with reference to special embodiments as illustrated in the followed figures.

DETAILED DESCRIPTION OF DRAWINGS

The following discussion describes the embodiments through which the invention can be realized.

Figure 1:
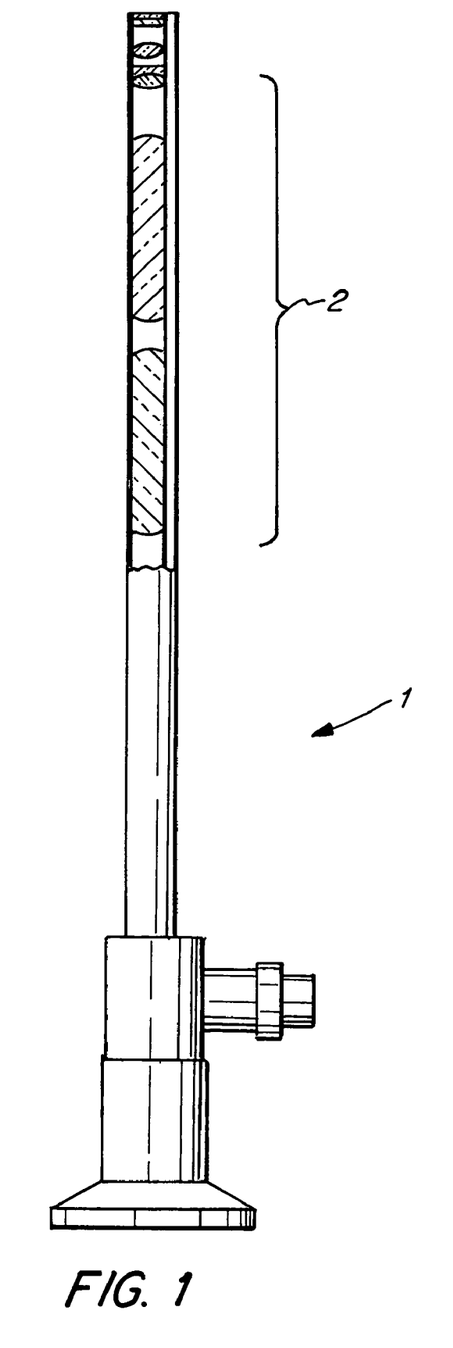
FIG. 1 shows an endoscope with a rod lens system having an inventive lens according to FIG. 3.

FIG. 1 shows an endoscope 1, in which a rod lens system 2 is installed.

Figure 2:
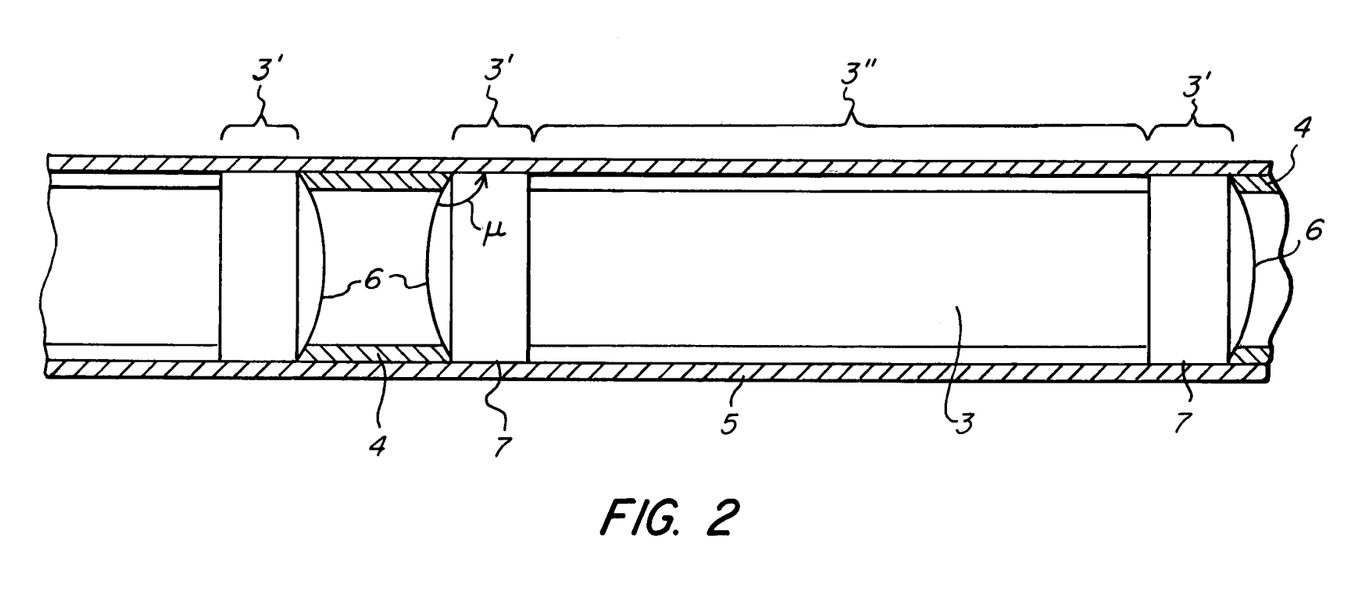
FIG. 2 shows a section of a rod lens system with an inventive bone-shaped rod lens as in FIG. 3.

A segment of a rod lens system 2 is illustrated in greater detail in FIG. 2. This example concerns a system 2, which consists of bone-shaped rod lenses 3 which are spaced apart by a distancing holder 4. The distancing holder 4 is situated between the two rod lenses 3, and these components are pressed to one another by means of screwing. For this purpose two sleeve-shaped shaft components 5 are screwed together so that a first shaft component 5, which is positioned on a first side, axially pressurizes a first external lens 3, situated on the first side, with force onto a second side, and a second shaft component 5, positioned on the second side, axially pressurizes a second external lens 3, situated on the second side, with force onto the first side. The distancing holder is applied between the lenses that are pressurized with force, so that the system 2, axially secured, is pressed with the two rod lenses 3 and the distancing holder 4.

The distancing holders 4 are pressed onto the lenses at positions which are located on external circles in the optically active surfaces 6.

To limit the likelihood of damage to the lenses 3 by the distancing holders 4, especially through forces which in a flexing of the shaft 5 at points of contact between the shaft 5 and the edge between optically active surface 6 and peripheral surface 7 of the lens 3, act upon this corner point, the edge angles [Greek letter] mu between optically active surfaces 6 and radial peripheral surfaces 7 of the lenses 3 are increased in order to prevent breaking on the edges determined by these angles.

Figure 3:
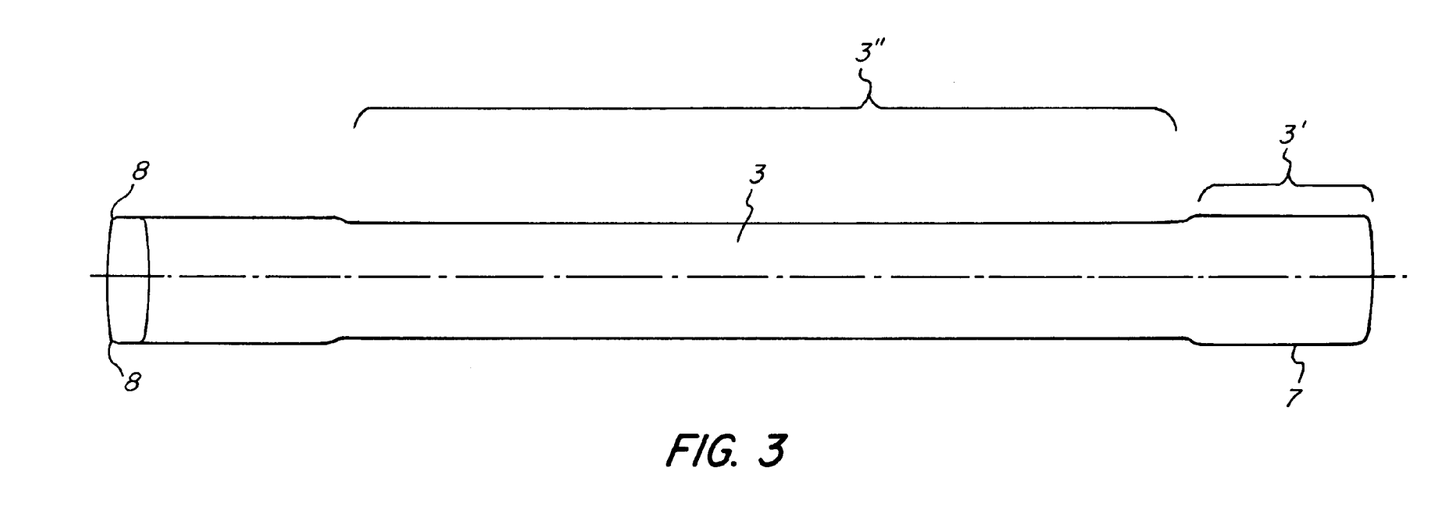
FIG. 3 shows an inventive rod lens with facets.

FIG. 3 depicts a bone-shaped rod lens 3 without surrounding sleeve, where here in particular the various lens segments are visible.

Figure 4A:
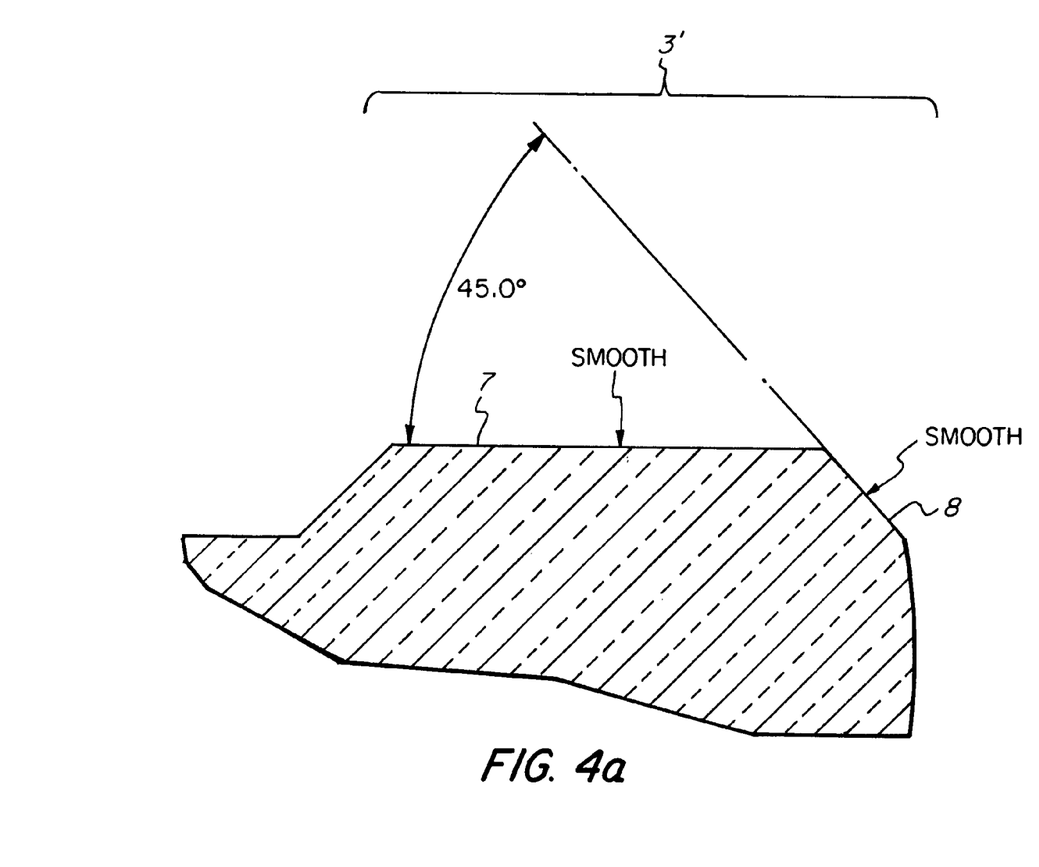
FIG. 4a shows a facet, which is at a 45-degree angle to the center axis of the lens, and an axial end section of the radial lens peripheral surface of an inventive bone-shaped rod lens.
Figure 4B:
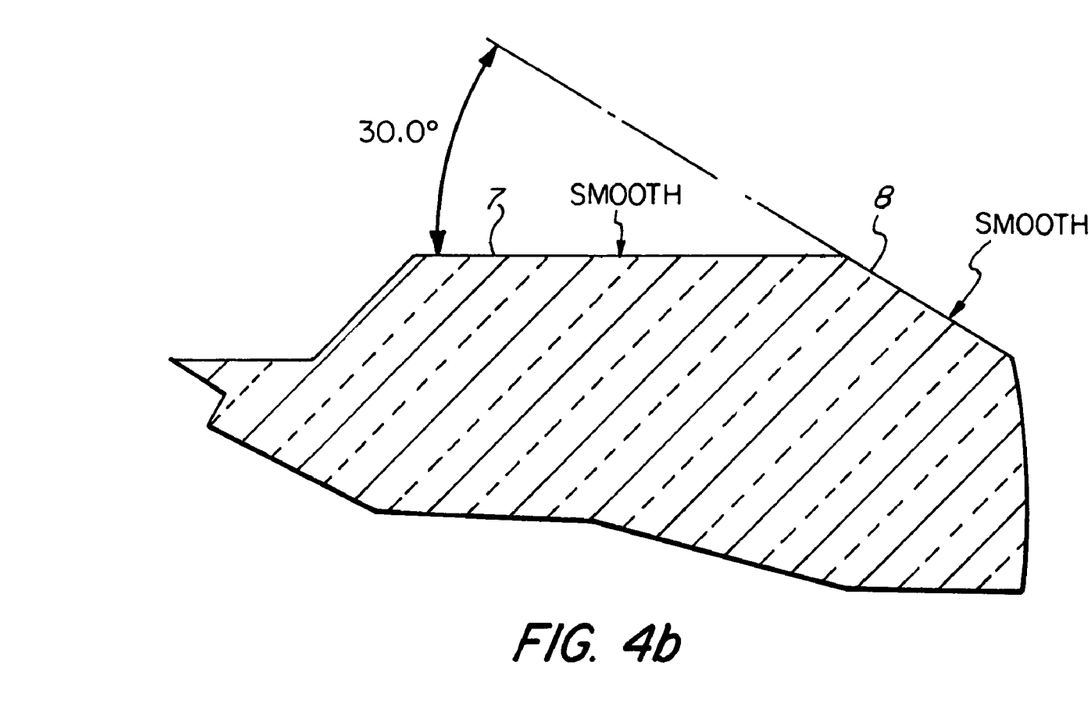
FIG. 4b shows a section as in FIG. 4a, but contrary to that drawing with a 30-degree facet angle to the center axis of the lens.
Figure 4C:
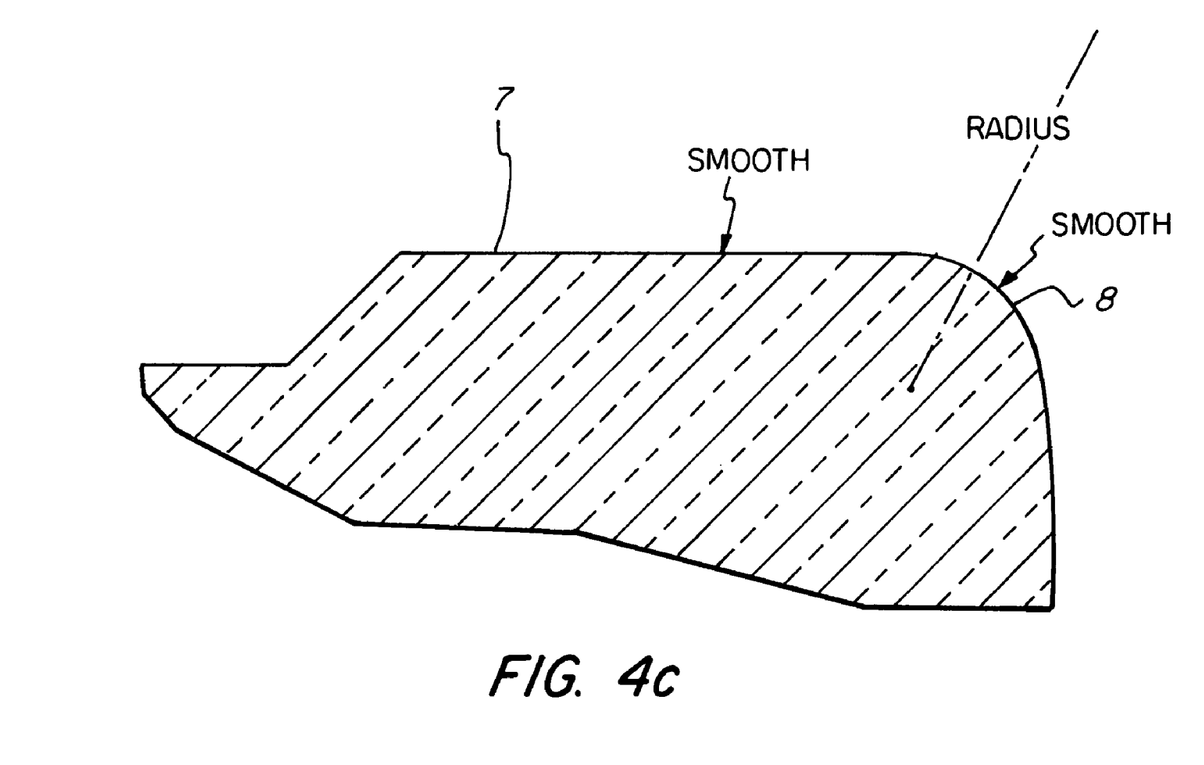
FIG. 4c shows a section as in FIG. 4a, but contrary to that drawing with a facet, which is configured as a radius between the optically active surface of the lens and its peripheral surface that is touching the lens holder.

The enlargement of the edge angles mu [Greek letter] is a beveling of the edges that form the edge angle mu as an interior angle, as is seen in FIGS. 4a to 4c, that is, a division of the angle mu into two individual angles. This bevel 8, called a facet, is so small that the distancing sleeve 4 or its inner edge stands radially inside the area of the facet on the lens, that is, always on its optically active surface. As shown in FIG. 4a, facets 8 are often produced at a 45-degree angle to the lens axis, that is, at a 45-degree angle to the radial peripheral surface 7 of the lens 3 and at an angle of nearly 45 degrees to the optically active surface 6. The latter angle, because of the lens curvature, is slightly smaller in fact than 45 degrees. The cited embodiment causes two theoretically equal resulting angles, thus a largest possible angle, as the smaller of the two resulting angles, which means the lowest danger of breaking off of the lens edge.

In an additional embodiment, which is shown in FIG. 4b, the facet 8 is at a 60-degree angle to the optically active surface 6 and a 30-degree angle to the lens axis. This structure has the disadvantage that the distancing sleeve 4, that is, the distancing holder 4, touches a surface, the optically active surface, which is more sharply angled toward the facet 8 and thus can more easily break; however, the angle of the facet 8 to the peripheral surface 7 of the lens 3 is smaller, which is decisive for breakage of the facet 8 in a flexing of the shaft 5. Thus forces arise here which, at contact points between the shaft 5 and the edge between optically active surface 6 and peripheral surface 7 of the lens 3, act on this corner point. Microscopically considered, the imposed surface at a smaller-angled facet surface 8, for instance 30 degrees, is greater than at a 45-degree-angled facet surface 8. This has an effect essentially with respect to the security against breakage of the edge between optically active surface 6 and peripheral surface 7.

An ideal form of the facet 8, in terms of this security against breakage, is depicted in FIG. 4c. Here the facet 8 is executed as a constant transition, that is, as a radius from the radial peripheral surface 7 to the optically active surface 6. Through this constant transition there exists no edge on which a clear pressure increase can occur during shaft bending. Likewise there is no edge on the transition between optically active surface 6 and facet 8, so that the risk of breaking off particles from the facet 8 from the pressure of the distancing sleeve 4 is minimized.

Figure 5A:
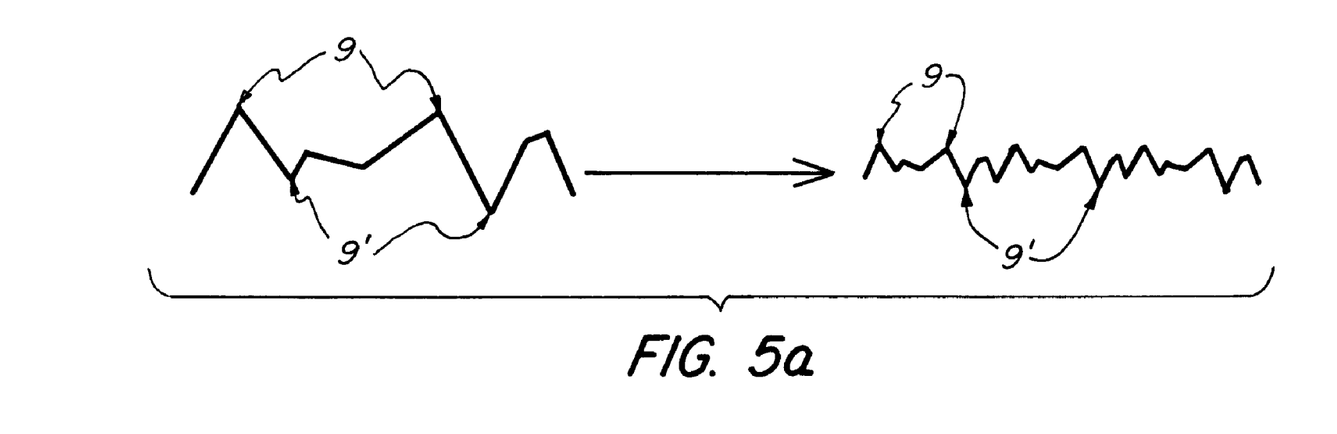
FIG. 5a shows a conceptual sketch of the effect of a quantitative treatment of the surface roughness of a lens, that is, in relation to the roughness depth of the surface.
Figure 5B:
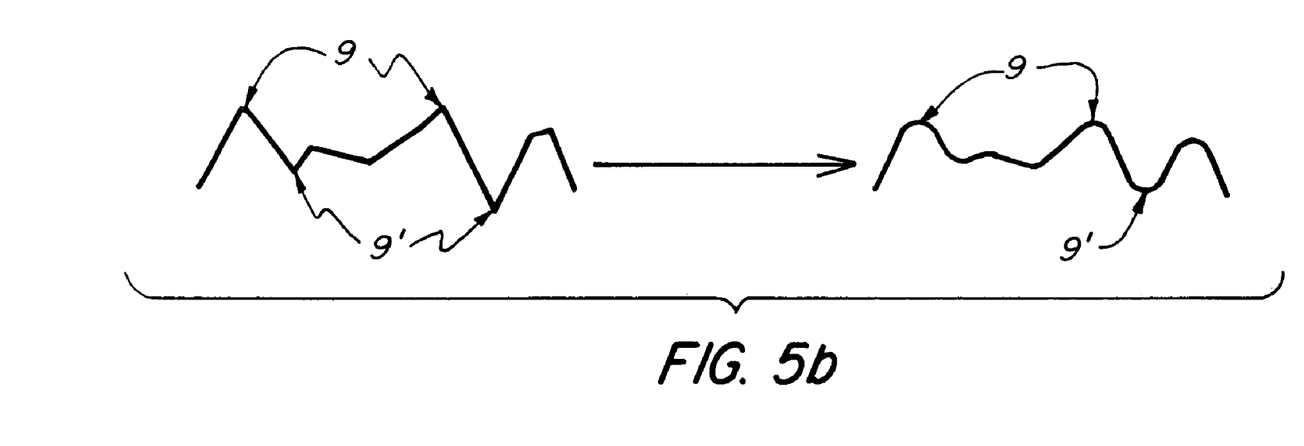
FIG. 5b shows a conceptual sketch of the effect of a qualitative treatment of the surface roughness of a lens, that is, in relation to the roughness structure of the surface.
Figure 6:
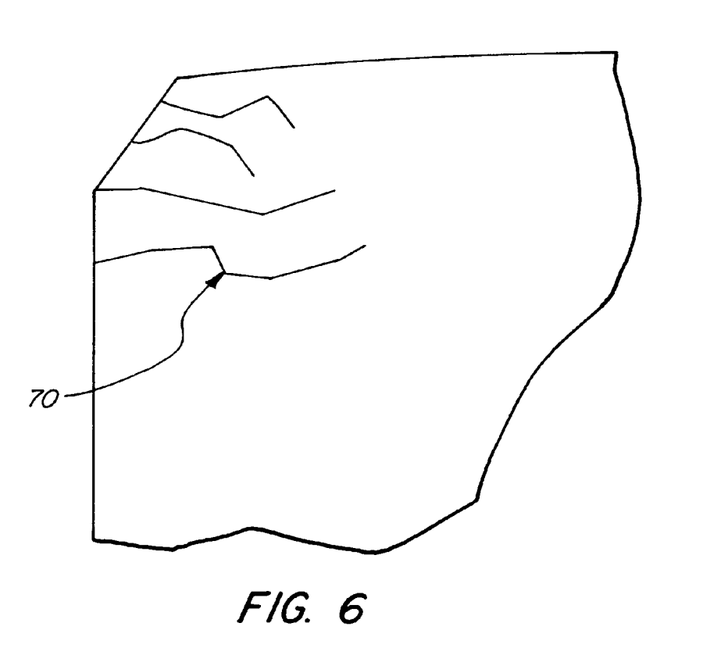
FIG. 6 shows schematic fissures or micro-fissures in the external layers of a facet, and areas close to the facet, of the lens, whose germs can develop, for instance, in the grinding of the facet.

As is shown in FIGS. 5a and 5b, the surfaces of the facets 8 as well as of the radial external surfaces 7 of the lenses after conventional grinding, preferably of the entire lens 3, are treated in such a way that they are in a smooth condition.

The result is a surface 7, 8 whose roughness depth is reduced, as is shown in FIG. 5a, and whose roughness structure is less stark, as is shown in FIG. 5b, that is, the microscopic elevations 9, or recesses 9', are accompanied by gentler transitions. Micro-fissures 10, as they can exist after a conventional grinding process, are eliminated or at least significantly reduced in size or number in the inventive, that is, smooth, surfaces of the facet 8 and/or peripheral surface 7. Thus fewer micro-fissures, or none at all, exist whose fissure progress can damage or destroy the entire lens 3, and owing to smoother, more micro-fissure-free surfaces 7, 8 there are also fewer germs for a fissure formation.

In the illustrated embodiment, the segment in which the radial peripheral surface 7 of the lens 3 is smooth, corresponds exactly to the segment 3' of the bone-shaped lens 3 with large radius, whereas the segment 3" of the bone-shaped lens 3 with small radius after the conventional grinding treatment is not smooth.

According to a preferred embodiment, the at least one optically inactive surface 7, 8 according to ISO 10110 is reflecting and can be considered as polished on the basis of a visual test.

The good quality of the reflecting surface 7, 8 according to ISO 1302: 1992 has a surface roughness of preferably P1, though it can also be P2, for example, or even finer.

Other than through polishing with a polishing agent (cerium oxide, iron oxide, circonium oxide, aluminum oxide, and other metallic oxides, or diamond) as a paste, the surface to be treated can be produced through so-called polish-grinding, according to a preferred embodiment, using a polishing agent that consists of diamond, grain size D7, or another of the aforementioned actual polishing agents and cast resin as polishing agent carrier (alternatives: pitch, laminated fabric, Kraft paper, polyurethane sheets, felt, other synthetics). The polishing agent carrier here binds the polishing agent and the resulting surface shows the appropriate roughness to allow the polishing grinding process to be carried out with the desired result (here: roughness according to ISO Norm P1).

The invention is not restricted to the embodiments described, but rather can be altered and modified appropriately without falling outside the protected area of the patent claims.

What is claimed is:

1. A rod lens with a surface that has at least one optically active area and, on its radial periphery, at least one optically inactive area, wherein on at least one axial end segment the lens has at least one smooth surface section and in the axially center segment of the lens is not smooth.

2. A bone-shaped rod lens with a surface that has at least one optically active area and, on its radial periphery, at least one optically inactive area, and where axially external segments of the rod lens have a greater diameter than the inner segment of the rod lens, wherein the optically inactive area on the peripheral surface with greater diameter has at least one segment with at least one smooth surface section, whereas it is not smooth in the inner segment of the lens.

3. A rod lens as in claim 1, wherein the non-smooth segment is a rough-ground surface area.

4. A rod lens as in claim 1, wherein the at least one smooth surface section is a surface of the lens that is exposed to mechanical impacts.

5. A rod lens as in claim 1, wherein on the end segment of the lens, between the optically active area and the radial peripheral surface, a facet is configured, which has at least one smooth surface area.

6. A rod lens as in claim 1, wherein the at least one smooth surface section has a reflecting surface or is polished.

7. A rod lens as in claim 6, wherein the at least one smooth surface section is polished according to ISO Norm Class P1 or more finely.

8. A method for producing a rod lens with a surface that has at least one optically active area and, on its radial periphery, at least one optically inactive area, wherein at least one surface section of the optically inactive surface is smoothed on at least one axial end segment of the lens.

9. A method for producing a bone-shaped rod lens with a surface that has at least one optically active area and, on its radial periphery, at least one optically inactive area, with the axial end segments of the rod lens having a greater diameter than the inner segment of the rod lens, wherein at least one surface section of the optically inactive area is smoothed on at least one peripheral surface that is of greater diameter.

10. A method as in claim 9, wherein the at least one surface section is polished.

11. A method as in claim 10, wherein the polishing is performed with a polishing agent carrier on a pitch base, laminated fabric base, polyurethane sheet base, felt base, synthetics base, and/or cast resin base and with a polishing agent that includes a metal oxide or diamond.

12. A method as in claim 11, wherein the method is a polishing by means of high-speed grinding.

13. A method as in claim 9, wherein the at least one surface section is warmed up to the softening temperature.

14. A method as in claim 13, wherein the warming is accomplished by means of a rubbing-rotating motion.

15. A method as in claim 14, wherein the rubbing-rotating motion is a rubbing- rotating motion similar to the high-speed grinding.

16. A method as in claim 13, wherein the warming is accomplished by treatment using laser radiation.

17. A method as in claim 16, wherein during that process the surface temperature is at least 500 degrees C.

18. A method as in claim 17, wherein a facet is smoothed.

19. A method as in claim 18, wherein the facet is produced by means of the smoothing.

20. A rod lens system that has at least one rod lens as in claim 7.

21. An endoscope with a rod lens system as in claim 20.

* * * * *